US008301186B2

(12) United States Patent  
Gorbachov

(10) Patent No.: US 8,301,186 B2  
(45) Date of Patent: Oct. 30, 2012

(54) ENHANCED SENSITIVITY RADIO FREQUENCY FRONT END CIRCUIT

(75) Inventor: Oleksandr Gorbachov, Catania (IT)

(73) Assignee: STMicroelectronics Ltd., Tsim Sha Tsui Kowloon (HK)

( * ) Notice: Subject to any disclaimer, the term of this patent is extended or adjusted under 35 U.S.C. 154(b) by 1000 days.

(21) Appl. No.: 12/062,666

(22) Filed: Apr. 4, 2008

(65) Prior Publication Data

US 2009/0253373 A1 Oct. 8, 2009

(51) Int. Cl.
*H04B 1/40* (2006.01)
*H04B 1/04* (2006.01)
*H01Q 11/12* (2006.01)
*H04M 1/00* (2006.01)

(52) U.S. Cl. ............... 455/550.1; 455/77; 455/127.2

(58) Field of Classification Search ............... 455/73, 455/77, 82, 88, 550.1, 121, 127.2, 306
See application file for complete search history.

(56) References Cited

U.S. PATENT DOCUMENTS

| | | | |
|---|---|---|---|
| 5,590,412 A | 12/1996 | Sawai et al. | |
| 6,957,047 B1* | 10/2005 | Young et al. | 455/83 |
| 7,079,815 B2 | 7/2006 | Pozgay et al. | |
| 7,231,189 B2* | 6/2007 | Rowe et al. | 455/78 |
| 7,729,448 B2* | 6/2010 | Dahlfeld | 375/299 |
| 2002/0151281 A1 | 10/2002 | Izadpanah et al. | |
| 2004/0198420 A1* | 10/2004 | He et al. | 455/552.1 |
| 2004/0219884 A1* | 11/2004 | Mo et al. | 455/67.11 |
| 2005/0208901 A1* | 9/2005 | Chiu et al. | 455/78 |
| 2007/0286306 A1 | 12/2007 | Dahlfeld | |
| 2008/0139118 A1 | 6/2008 | Sanguinetti | |
| 2009/0017775 A1* | 1/2009 | Qiao et al. | 455/78 |
| 2009/0251221 A1* | 10/2009 | Gorbachov | 330/301 |
| 2009/0253384 A1* | 10/2009 | Gorbachov | 455/83 |
| 2011/0009074 A1* | 1/2011 | Hsu et al. | 455/73 |

OTHER PUBLICATIONS

SiGe Semiconductor; "SE2542A 2.4 GHz/5GHz Dual Band Wireless LAN Front End Module—Product Preview"; Dec. 19, 2003; pp. 1-12.
Skyworks Solutions, Inc.; "Preliminary Data Sheet—SKY65200: WLAN 802.11a/b/g RF Front-End Module"; Oct. 10, 2003; pp. 1-3.
RF Micro-Devices; "RF5324 3.3 V. Dual-Band Front-End Module"; Apr. 4, 2001; pp. 8-1 through 8-10.
Texas Instruments; "CC2591—2.4-GHz RF Front End"; Mar. 2008 (Revised Jun. 2008); pp. 1-18.
Texas Instruments; TRF2436—High-Power Dual-Band (2.4-GHz to 2.5-GHz and 4.9-GHz to 5.9-GHz) RF Front-End; Apr. 2005 (Revised May 2007); pp. 1-15.

* cited by examiner

*Primary Examiner* — Andrew Wendell
(74) *Attorney, Agent, or Firm* — Gardere Wynne Sewell LLP

(57) ABSTRACT

An enhanced sensitivity radio frequency (RF) front end circuit includes a transformer configured to convert a balanced transmit signal to an unbalanced transmit signal and to convert a second filtered receive signal to a balanced receive signal. A switch in a first state receives the unbalanced transmit signal from the transformer and transfers the unbalanced transmit signal to an amplifier circuit and receives an amplified transmit signal from the amplifier circuit and transfers the amplified transmit signal to a filter. In a second state, the switch receives a first filtered receive signal from the filter and transfers the first filtered receive signal to the amplifier circuit and receives a second filtered receive signal from the amplifier circuit and transfers the second filtered receive signal to the transformer. In a first state, the amplifier circuit receives the unbalanced transmit signal from the switch and amplifies the unbalanced transmit signal to generate the amplified transmit signal, and in a second state, the amplifier circuit receives the first filtered receive signal from the switch and attenuates selected first frequencies to generate the second filtered receive signal.

15 Claims, 8 Drawing Sheets

ENHANCED SENSITIVITY RADIO FREQUENCY FRONT END CIRCUIT

TECHNICAL FIELD

This disclosure relates generally to electronic circuits and, more particularly, this disclosure relates to enhanced sensitivity radio frequency (RF) front end circuits for wireless devices.

BACKGROUND

Radio Frequency (RF) front end circuits are used in wireless devices such as mobile phones, personal digital assistants, lap-top computers and other communication devices. The front end circuits are typically coupled to a transceiver chip (e.g., Bluetooth or ZigBee) in a wireless device. They increase the range of a wireless link by delivering increased output power during transmission along with low-pass filtering of harmonics while band-pass filtering during reception.

The front end circuits are often implemented as integrated modules. FIG. 1A illustrates a conventional RF front end circuit 100, which may be implemented as an integrated module interfacing with a transceiver chip 104 and an antenna 108. The front end circuit 100 includes a transformer 112 (balun) with its primary and secondary windings configured to provide a differential terminal 112D and a single-ended terminal 112S. The balun may be implemented by inductor-coupled printed or lumped-element components. During a transmit mode, the transformer 112 receives a differential RF signal at the differential terminal 112D from the transceiver chip 104 and converts the differential RF signal into a single-ended RF transmit signal at the single-ended terminal 112S. A single pole double throw (SPDT) switch 116 is coupled to the transformer 112. More specifically, the SPDT switch includes Ports 1-3, Port 1 being connected to the single-ended terminal 112S of the transformer 112 and Port 2 being connected to the input of a power amplifier 120. The internal connections among Ports 1-3 are controlled by a transmit/receive signal from the transceiver chip 104 (e.g., general purpose input-output (GPIO) signal) so that during the transmit mode Port 1 is connected to Port 2 and during the receive mode Port 1 is connected to Port 3. The single-ended RF transmit signal is routed by the SPDT switch 116 via Ports 1 and 2 to the power amplifier 120.

The output of the power amplifier 120 is coupled to a SPDT switch 124. More specifically, the SPDT switch 124 includes Ports 1-3, Port 1 being connected to a band pass filter 128 and Port 2 being connected to the output of the power amplifier 120. Port 3 of the SPDT switch 124 is connected to Port 3 of the SPDT switch 116. The power amplifier 120 amplifies the single-ended RF transmit signal and generates an amplified transmit signal in order to provide increased transmit power for enhancing the range of the wireless link. The amplified transmit signal is received at Port 2 of the SPDT switch 124. Responsive to a transmit/receive control signal from the transceiver chip 104, the internal connections of the SPDT switch 124 are configured so that Port 1 is connected to Port 2 during the transmit mode and Port 1 is connected to Port 3 during the receive mode. The SPDT switch 124 routes the amplified transmit signal to the band pass filter 128 via Ports 2 and 1. The band pass filter 128 substantially attenuates frequencies outside a selected pass band from the amplified transmit signal and generates a filtered transmit signal that is provided to the antenna 108. The antenna 108 converts the filtered transmit signal into electromagnetic waves for wireless transmission.

During the receive mode, a receive signal from the antenna 108 is filtered by the band pass filter 128. The filtered receive signal is received by the SPDT switch 128 at Port 1. Since during the receive mode, Ports 1 and 3 of the both the SPDT switches 124 and 116 are connected, the filtered receive signal is routed by the switches 124 and 116 to the single-ended terminal 112S of the transformer 112. The transformer 112 converts the filtered unbalanced receive signal into a differential receive signal, which is provided to the transceiver chip 104 via the differential terminal 112D.

FIG. 1B illustrates a conventional, enhanced sensitivity RF front end circuit 140. The front end circuit 140 includes a balun 142 having a differential terminal 142D and a single ended terminal 142S. The differential terminal 142D of the balun 142 is coupled to a transmit/receive port (RF_TX/RX) of a transceiver 144.

The front end circuit 140 includes a single pole double throw (SPDT) switch 146 coupled to the balun 142. The SPDT switch 146 includes Ports 1-3, Port 1 being connected to the single-ended terminal 142S of the balun 142, Port 2 being connected to the input terminal 148I of a power amplifier 148, and Port 3 being connected to the output terminal 150O of a low noise amplifier (LNA) 150. The internal connections among Ports 1-3 are controlled by a transmit/receive signal from the transceiver 144 (e.g., general purpose input-output (GPIO) signal) so that during the transmit mode Port 1 is connected to Port 2 and during the receive mode Port 1 is connected to Port 3.

During the transmit mode, the single-ended RF transmit signal is routed by the SPDT switch 146 via Ports 1 and 2 to the input terminal 148I of the power amplifier 148. The output terminal 148O of the power amplifier 148 is coupled to a SPDT switch 152. The SPDT switch 152 includes Ports 1-3, Port 1 being connected to a band pass filter 154, Port 2 being connected to the output terminal 148O of the power amplifier 148, and Port 3 being connected to the input terminal 150I of the LNA 150.

During the transmit mode, the power amplifier 148 amplifies the single-ended RF transmit signal and generates an amplified transmit signal. The amplified transmit signal is received at Port 2 of the SPDT switch 152. Responsive to the transmit/receive control signal from the transceiver 144, the internal connections of the SPDT switch 152 are configured so that Port 1 is connected to Port 2 during the transmit mode and Port 1 is connected to Port 3 during the receive mode. The SPDT switch 152 routes the amplified transmit signal to the band pass filter 154 via Ports 2 and 1. The band pass filter 154 substantially attenuates frequencies outside a selected pass band from the amplified transmit signal and generates a filtered transmit signal that is provided to the antenna 156.

During the receive mode, responsive to the transmit/receive control signal from the transceiver 144, the internal connections of the SPDT switch 152 are configured so that Ports 1 and 3 are connected. Likewise, during the receive mode, the internal connections of the SPDT switch 146 are configured so that Ports 1 and 3 are connected. Thus, it will be appreciated that a receive signal from the antenna 156 is filtered by the band pass filter 154, and the filtered receive signal is received at Port 1 of the switch 152. Since Port 1 is connected to Port 3 in the receive mode, the filtered receive signal is transferred via Port 3 to the input terminal 150I of the LNA 150. The LNA 150 amplifies the filtered receive signal to increase receiver sensitivity and generates an amplified receive signal at the output terminal 150O. The amplified receive signal is received at Port 3 of the switch 146. Since, Port 3 is connected to Port 1 in the receive mode, the amplified receive signal is transferred to the single-ended terminal 142S of the balun 142 via Port 1. The transformer 142 outputs a differential receive signal at the differential terminal 142D, which is provided to the transceiver 144.

FIG. 1C shows a conventional dual mode RF front end circuit 170 that may interface with a Bluetooth transceiver 172 and a WLAN transceiver 174. The Bluetooth transceiver 172 and the WLAN transceiver 174 operate in the same frequency band. The construction of the front end circuit 170 differs from that of the front end circuit 100 shown in FIG. 1 due to the fact that the front end circuit 170 features a first balun 176 adapted to interface with the Bluetooth transceiver 172 and a second balun 178 adapted to interface with the WLAN transceiver 174. A single pole triple throw (SP3T) switch 180 is controlled by a GPIO signal to either enable the WLAN transceiver 172 or the Bluetooth transceiver to transmit and/or receive. Two SPDT switches 182 and 184 are selectively controlled to route transmit signal through a power amplifier 186 during the transmit mode, but to remove the power amplifier 186 from the signal path during the receive mode. The operation of the conventional dual mode RF front end circuit 170 will be apparent to those skilled in the art and thus will not be described herein.

There are several disadvantages associated with existing enhanced sensitivity front end circuits. The front end circuits require two switches to operate, which increases cost and space requirement inside a module. The need for two switches also causes increased power loss during a receive mode. Also, the front end circuits require a power amplifier and a low noise amplifier, thus requiring increased space and additional cost.

SUMMARY OF THE DISCLOSURE

An enhanced sensitivity radio frequency (RF) front end circuit includes a transformer configured to convert a balanced transmit signal to an unbalanced transmit signal and to convert a second filtered receive signal to a balanced receive signal. The RF front end circuit includes a switch configured to operate in first and second states. In the first state, the switch receives the unbalanced transmit signal from the transformer and transfers the unbalanced transmit signal to an amplifier circuit and receives an amplified transmit signal from the amplifier circuit and transfers the amplified transmit signal to a filter. In the second state, the switch receives a first filtered receive signal from the filter and transfers the first filtered receive signal to the amplifier circuit and receives a second filtered receive signal from the amplifier circuit and transfers the second filtered receive signal to the transformer.

The amplifier circuit is configured to operate in first and second states. In the first state, the amplifier circuit receives the unbalanced transmit signal from the switch and amplifies the unbalanced transmit signal to generate the amplified transmit signal. In the second state, the amplifier circuit receives the first filtered receive signal from the switch and attenuates selected first frequencies to generate the second filtered receive signal. The filter receives the amplified transmit signal from the switch and attenuates selected second frequencies outside a selected pass band to generate a filtered transmit signal and receives a receive signal and attenuates the selected second frequencies outside the selected pass band to generate the filtered receive signal.

DETAILED DESCRIPTION OF THE INVENTION

Figure 1A:
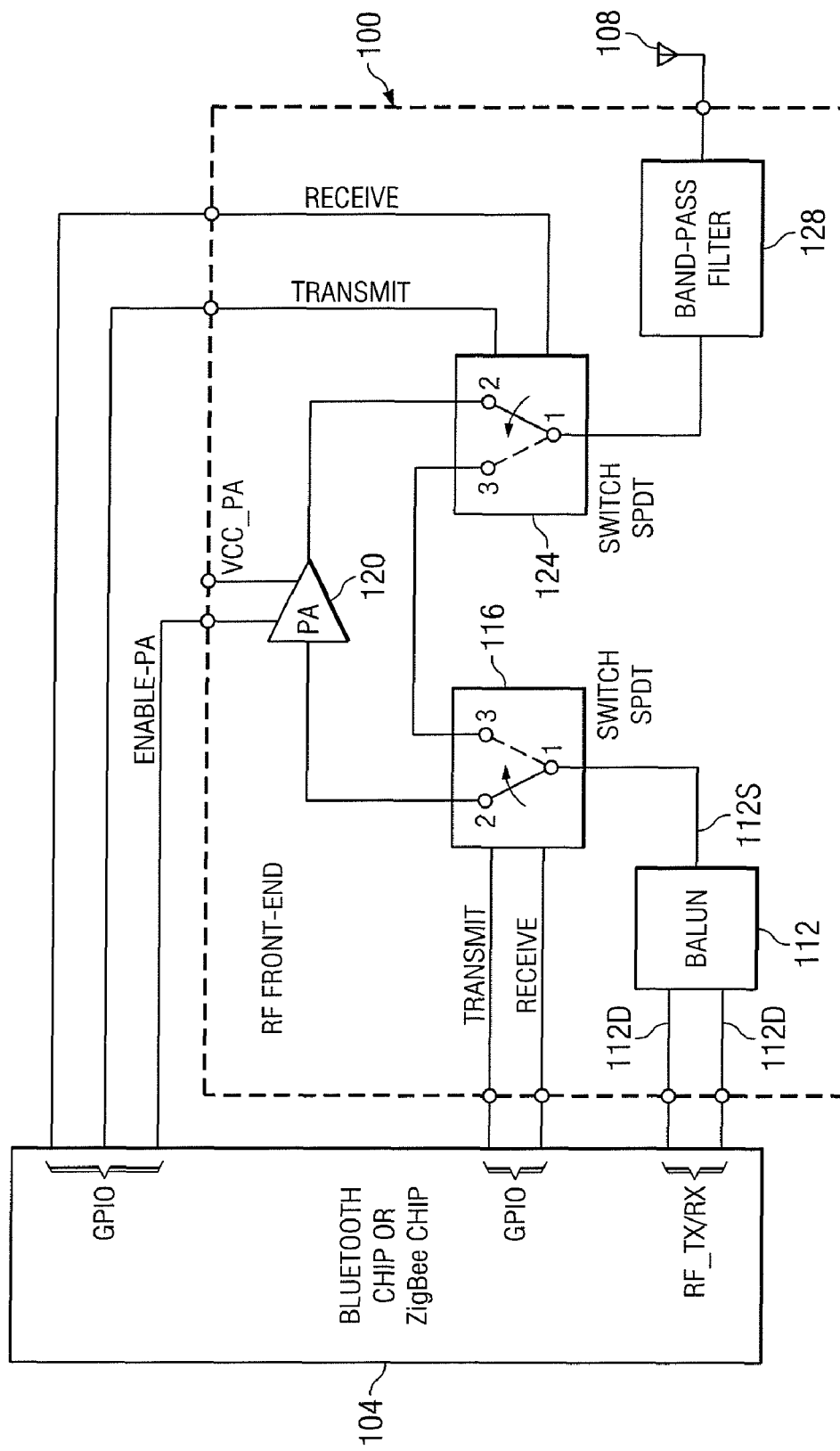
FIG. 1A is a conventional RF front end circuit.
Figure 1B:
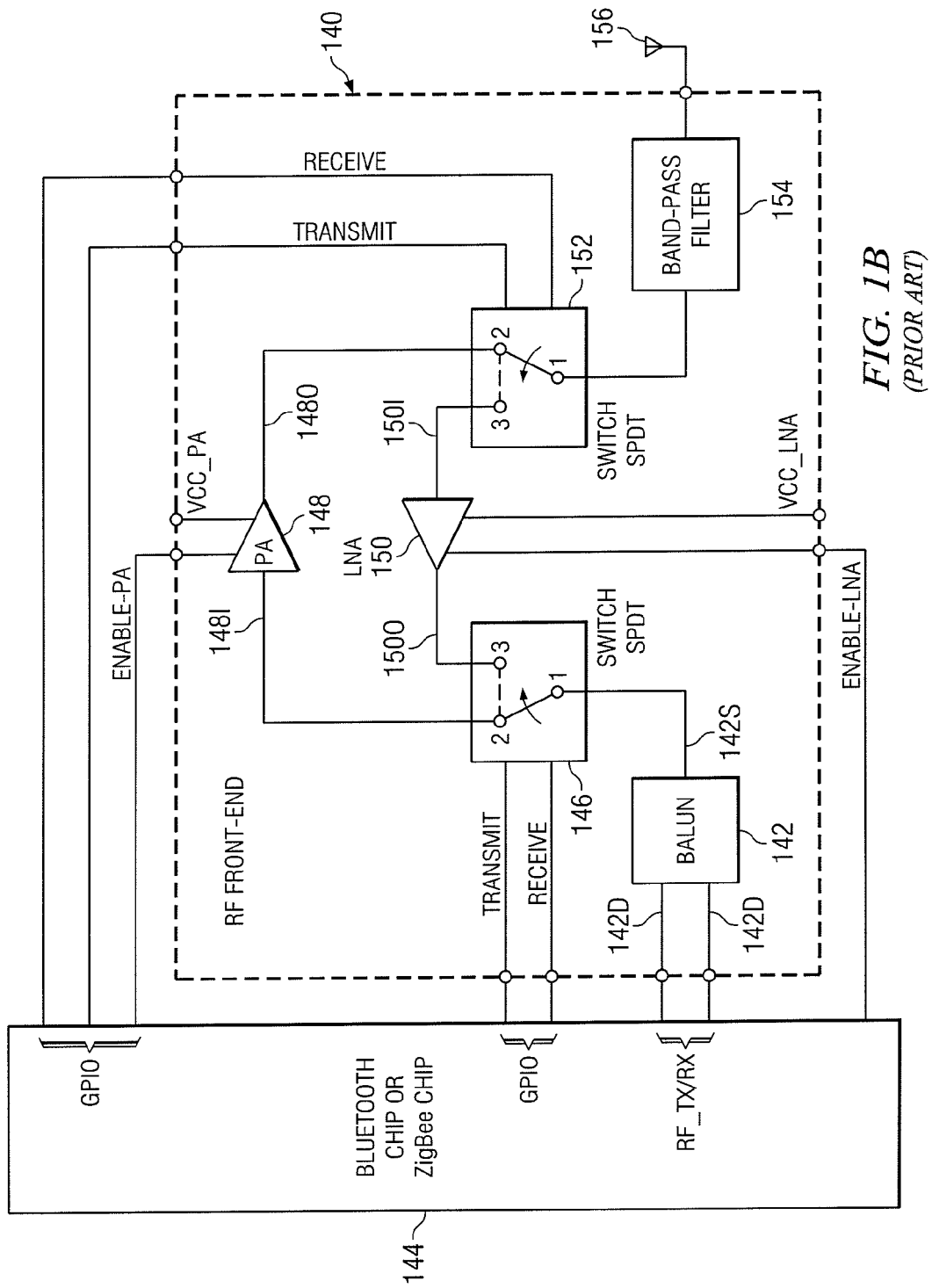
FIG. 1B is a conventional, increased sensitivity RF front end circuit.
Figure 1C:
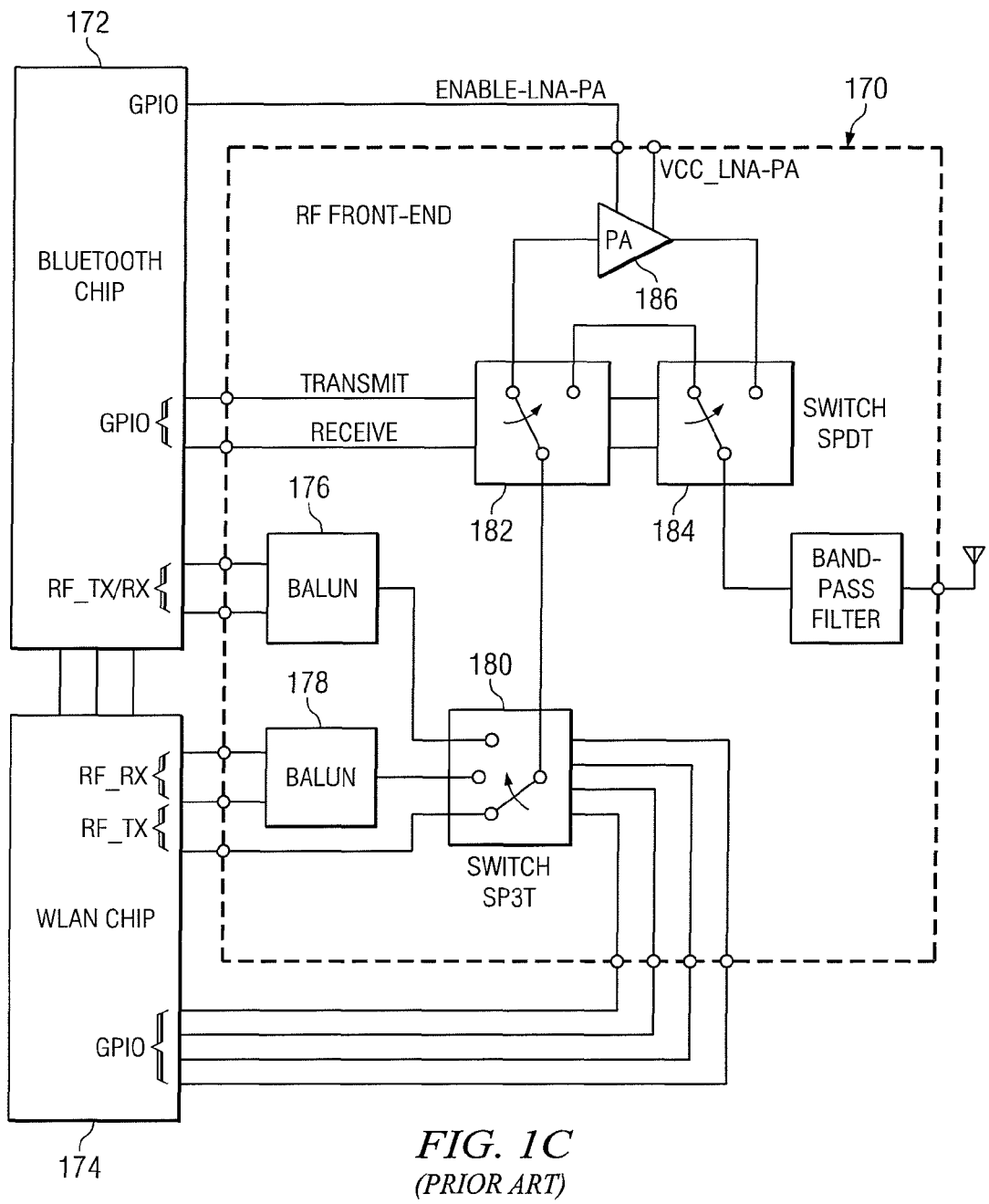
FIG. 1C is a conventional dual mode RF front end circuit.
Figure 2:
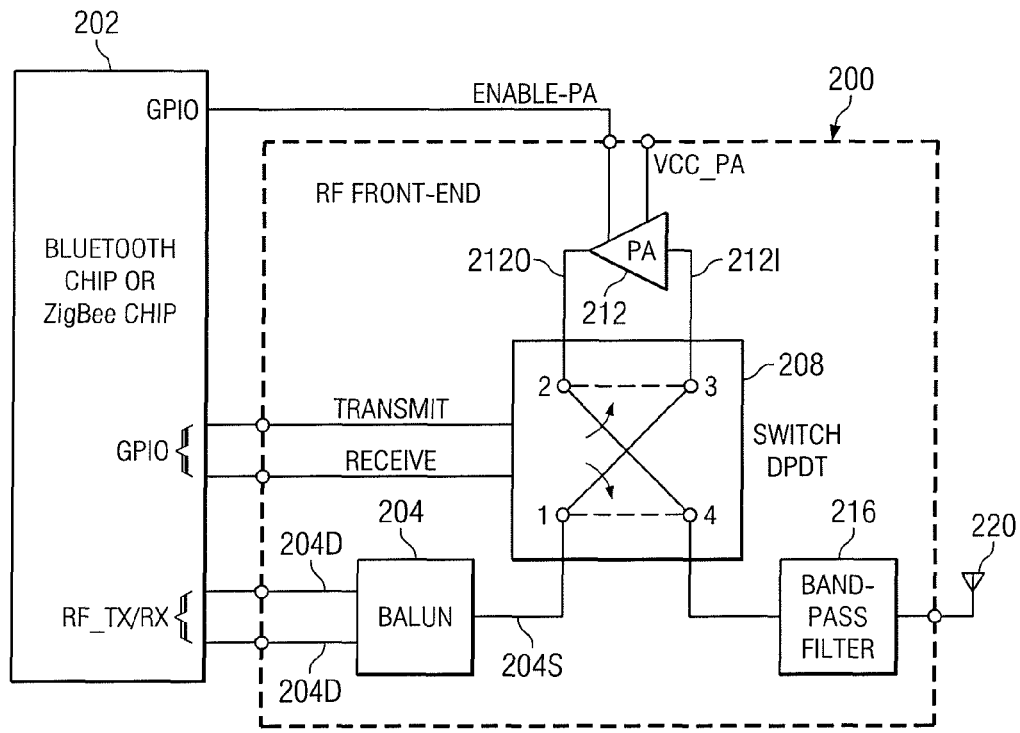
FIG. 2 is an RF front end circuit according to one example embodiment.

A radio frequency (RF) front end circuit 200 in accordance with one example embodiment is shown in FIG. 2. The front end circuit 200 may be used in mobile phones, personal computers, and other wireless devices. In particular, the front end circuit 200 may be coupled to an RF transceiver 202 such as a Bluetooth or a ZigBee transceiver used in wireless devices.

The front end circuit 200 includes a transformer 204 for conversion between balanced and unbalanced RF signals. In particular, the transformer 204 may be a balun with primary and secondary windings configured to provide a differential terminal 204D and a single-ended terminal 204S. The differential terminal 204D of the transformer 204 is coupled to an RF transmit/receive (RF_TX/RX) terminal of the transceiver chip 202.

During transmission, the transformer 204 receives a balanced RF signal at the differential terminal 204D from the transceiver chip 202 and generates an unbalanced RF signal at the single-ended terminal 204S. During reception, the transformer 104 receives an unbalanced RF signal at the single-ended terminal 204S and generates a balanced RF signal at the differential terminal 204D. The balanced RF signal is provided to the transceiver chip 102 via the differential terminal 204D.

The front end circuit 200 includes a switch 208. In one embodiment the switch 208 is a double pole double throw (DPDT) switch 208 having four ports, Ports 1-4. The ports of the switch 208 are connected as follows: Port 1 is connected to the single-ended terminal 204S of the transformer 204; Port 2 is connected to an output terminal 212O of a power amplifier 212; Port 3 is connected to an input terminal 212I of the power amplifier 212; Port 4 is connected to a band pass filter 216.

The internal connections of Ports 1-4 are controlled by a control signal provided by the transceiver chip 202. During the transmit mode, in response to a first control signal (Transmit) from the transceiver chip 202, Port 1 is connected to Port 3 and Port 2 is connected to Port 4, thereby routing outgoing RF signals through the power amplifier 212. During the receive mode, in response to a second control signal (Receive) from the transceiver chip 202, Port 1 is connected to Port 4 and Port 2 is connected to Port 3 (see dotted lines), thus removing the power amplifier 212 from the signal path. As will be apparent to those skilled in the art, during the transmit mode, the power amplifier 212 provides increased transmit power to enhance the wireless link. The power amplifier 212 may be controlled by the transceiver chip 202 by activating and deactivating an enable signal (Enable-PA) thus saving current consumption in the receive mode and avoiding stability problems of amplifier 212 due to connection of Port 2 and Port 3 of DPDT switch 208.

As discussed before, during the transmit mode, the unbalanced RF signal is received by the switch 208 at Port 1. Since Port 1 is connected to Port 3 during the transmit mode, the unbalanced RF signal is routed to the input terminal 212I of the power amplifier 212.

The amplifier 212 amplifies the unbalanced transmit signal and outputs an amplified transmit signal at the output terminal 212O. The amplified transmit signal is received by the switch 208 at Port 2. Since Port 2 is connected to Port 4 in the transmit mode, the amplified transmit signal is transferred, via Ports 2 and 4, to the band pass filter 216.

The band pass filter 216 receives the amplified transmit filter from Port 4 of the Switch 208. The band pass filter 216 attenuates frequencies outside a selected pass band and generates a filtered transmit signal. The filtered transmit signal is provided to the antenna 120 for wireless transmission.

During the receive mode, RF signal received by the antenna 220 is provided to the band pass filter 216. The band pass filter 216 attenuates frequencies outside the selected pass band and generates a filtered receive signal. The band pass filter 216 provides the filtered receive signal to Port 4 of the switch 208. Since Port 4 is connected to Port 1 during the receive mode, the filtered receive signal is transferred, via Ports 4 and 1, to the single-ended terminal 204S of the transformer 204. As will be understood by those skilled in the art, the filtered receive signal is an unbalanced signal that is converted to a balanced receive signal by the transformer 204. The balanced receive signal is provided to the transceiver chip 202 via the differential terminal 204D.

During the receive mode, the amplifier 212 may be disabled by deactivating or removing the Enable-PA signal provided. In one embodiment, the front end circuit 200 optionally may be operated during the transmit mode with the amplifier 212 being disabled, but allowing the switch 208 to provide transmit power from the transceiver chip 202 directly to the antenna 220. It will be apparent to those skilled in the art that the front end circuit 200 may be modified by allowing the switch 208 to provide power to the antenna 220, thus eliminating the need for the power amplifier 212 and essentially operating the front end circuit 200 as a low power circuit.

The front end circuit 200 features a single DPDT-type switch in contrast to various existing circuits that feature two switches. The use of a single DPDT-type switch instead of two switches results in lower switching loss in the receive mode and lower cost. Also, a single DPDT-type switch occupies less space than two switches, which is desirable in a module-type implementation. Furthermore, long term average efficiency of the front end circuit 200 is increased by deactivating the power amplifier 212 during a low power transmit mode and allowing the switch 208 to provide power to the antenna 220.

Figure 3:
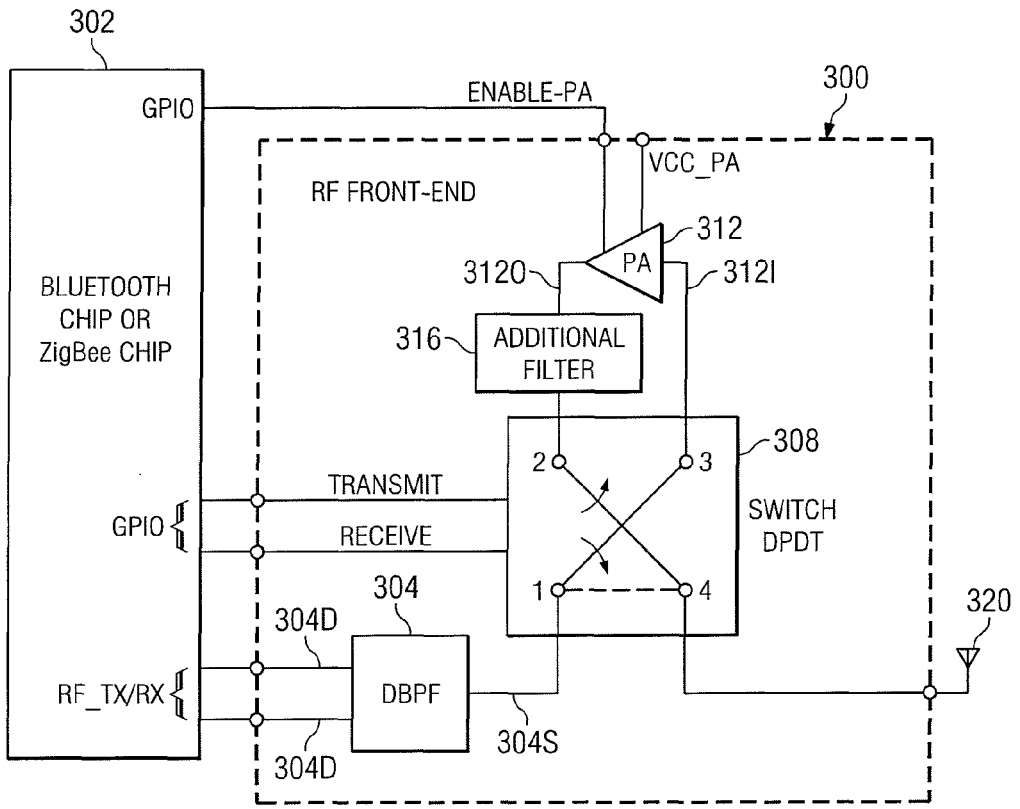
FIG. 3 is an RF front end circuit according to another example embodiment.

FIG. 3 illustrates an RF front end circuit 300 according to another example embodiment. The front end circuit 300 is coupled to a transceiver 202 and an antenna 320. The transceiver 302 may, for example, be a Bluetooth or a ZigBee transceiver. The front end circuit 300 includes a differential band pass filter 304 having a differential terminal 304D and a single-ended terminal 304S. The differential terminal 304D is connected to a transmit/receive (RF_TX/RX) port of the transceiver chip 304. The differential band pass filter 304 attenuates frequencies outside a selected pass band and also converts a differential RF signal into a single-ended RF signal and vice versa.

The front end circuit 300 includes a switch 308. The switch 308 may be a double pole double throw (DPDT) switch 308 having four ports, Ports 1-4. Port 1 is connected to the single-ended terminal 304S of the differential band pass filter 304 and Port 4 is connected to the antenna 320. Ports 3 and 2 are connected to an input terminal 312I and an output terminal 312O, respectively, of an amplifier 312. The amplifier 312 may be a power amplifier that amplifies outgoing transmit signals, thereby providing increased power to the antenna 320. The amplifier 312 may be controlled by the transceiver 302 by activating and deactivating an enable signal (Enable-PA).

The internal connections of Ports 1-4 are controlled by control signals (Transmit/Receive) provided by the transceiver 302. In one embodiment, during a transmit mode, in response to a first control signal (Transmit), Port 1 is connected to Port 3 and Port 2 is connected to Port 4.

It will be apparent that the construction of the front end circuit 300 is similar to the front end circuit 200 shown in FIG. 2, except the front end circuit 300 has a differential band pass filter 304 instead of a band pass filter and a transformer as shown in FIG. 2. In operation, during the transmit mode, a differential RF transmit signal from the transceiver 302 is received at the differential terminal 304D of the differential band pass filter 304. The differential RF transmit signal is converted into a single-ended RF transmit signal at the single-ended terminal 304S. The single-ended RF transmit signal is received by the switch 308 at Port 1. Since Port 1 and Port 3 are connected in the transmit mode, the single-ended RF transmit signal is transferred to the input terminal 312I of the amplifier 312. The amplifier 312 amplifies the single-ended RF transmit signal and generates an amplified transmit signal at the output terminal 312O. The amplified transmit signal is received by the switch 308 at Port 2. Since Port 2 is connected to Port 4 during the transmit mode, the amplified transmit signal is transferred to the antenna 320 via Port 4.

During the receive mode, responsive to a second control signal (Receive) from the transceiver chip 302, Port 1 is connected to Port 4 (see, dotted line), thus removing the amplifier 312 (and filter 316) from the signal path. A receive signal from the antenna 320 is transferred via Port 4 and Port 1 of the switch 308 to the single-ended terminal 304S of the differential band pass filter 304. The receive signal is filtered by the differential band pass filter 308 and is also converted to a differential RF signal. The differential RF signal is provided to the transceiver 302 via the differential terminal 304D.

By utilizing a differential band pass filter 304 that provides both filtering and differential to single-ended signal conversion, the front end circuit 300 provides increased efficiency in the transmit mode by eliminating a band pass filter between the output terminal 312O of the amplifier 312 and the antenna 320. In particular, transmit efficiency is increased because the differential band pass filter 308 is used between the transceiver chip 302 and the switch 308 used instead of a high loss band pass filter between the switch 308 and the antenna 320. In one embodiment, a low pass filter 316 optionally may be coupled to the output of the amplifier 312 in order to attenuate higher order harmonics typically produced by the power amplifier 312 at large signal level. The addition of the optional low pass filter 316 does not significantly degrade the efficiency of the circuit 300 because the low pass filter typically causes considerably lower power loss than a typical band pass filter. The front end circuit 300 can be implemented as a low-cost RF front end module for Bluetooth or ZigBee applications because the front end circuit 300 requires a single DPDT-type switch instead of two switches as shown in FIG.

1. The use of a single DPDT-type switch instead of two switches also results in a relatively small size.

During the receive mode, the amplifier 312 may be disabled by deactivating or removing the Enable-PA signal provided. In one embodiment, the front end circuit 300 optionally may be operated during the transmit mode with the amplifier 312 being disabled, but allowing the switch 308 to provide transmit power from a transceiver chip 302 directly to the antenna 320. It will be apparent to those skilled in the art that the front end circuit 300 may be modified by allowing the switch 308 to provide power to the antenna 320, thus eliminating the need for the power amplifier 312 and essentially operating the front end circuit 300 as a low power circuit.

Figure 4:
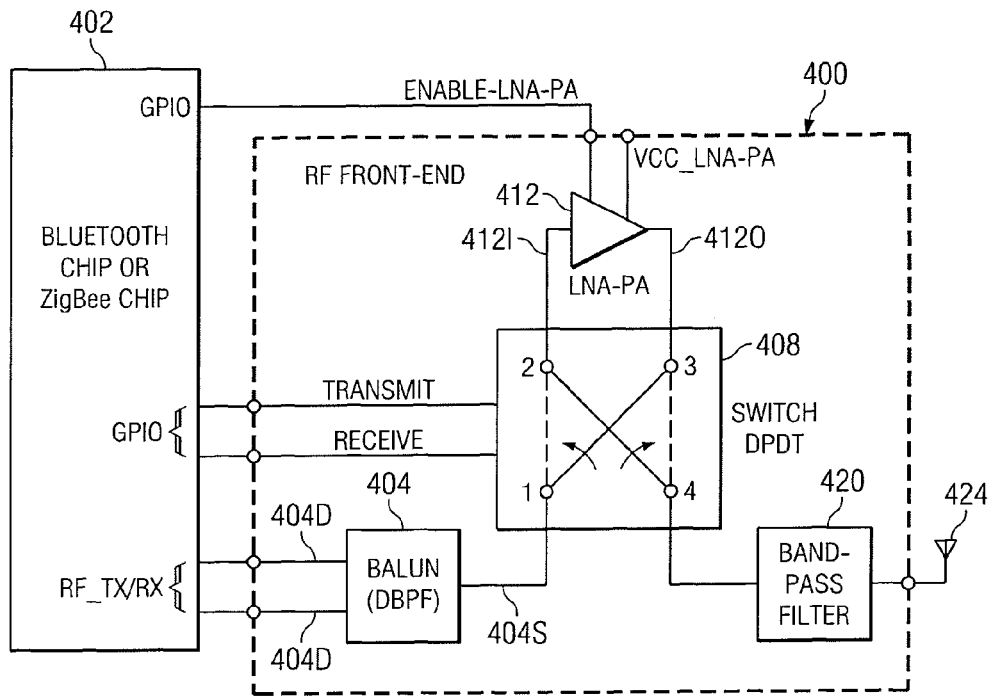
FIG. 4 is an enhanced sensitivity RF front end circuit according to an example embodiment.

FIG. 4 illustrates an enhanced sensitivity RF front end circuit 400 according to an example embodiment. The front end circuit 400 may be implemented as an RF front end module interfacing with a transceiver 402 and an antenna 424. The front end circuit 400 includes a transformer 404 having a differential terminal 404D and a single ended terminal 404S. The transformer 404 converts a differential signal into a single-ended signal and vice versa. As will be apparent to those skilled in the art, a differential band pass filter may be used in lieu of the transformer 404. The differential terminal 404D of the transformer 404 is coupled to a transmit/receive port (RF_TX/RX) of the transceiver 402.

The front end circuit 400 includes a switch 408, which may be a double pole double throw (DPDT) switch 408 having four ports, Ports 1-4. The four ports of the switch 408 are connected as follows: Port 1 is connected to the single-ended terminal 404S of the transformer 404, Port 2 is connected to an input terminal 412I of an amplifier 412; Port 3 is connected to an output terminal 412O of the amplifier 412; Port 4 is connected to a band pass filter 420.

The internal connections of Ports 1-4 are controlled by control signals provided by the transceiver 402. In one embodiment, during a transmit mode, in response to a first control signal (Transmit) from the transceiver 404, Port 1 is connected to Port 2 and Port 3 is connected to Port 4 as illustrated by the dotted lines. During a receive mode, in response to a second control signal (Receive) from the transceiver chip 402, Port 1 is connected to Port 3 and Port 2 is connected to Port 4 as illustrated by the solid lines.

In one embodiment, the amplifier 412 operates as a power amplifier during the transmit mode and as a low noise amplifier during the receive mode. The amplifier 412 can be operated as a power amplifier or as a low noise amplifier by adjusting a dc bias voltage (Vcc_LNA_PA) applied to the amplifier 412. The amplifier 412 may be activated or deactivated by a control signal (Enable-LNA-PA) from the transceiver chip 402.

During the transmit mode, a differential RF transmit signal from the transceiver chip 402 is received by the transformer 404 at the differential terminal 404D. The transformer 404 converts the differential transmit signal into a single-ended RF transmit signal at the single-ended terminal 404S. The single-ended RF transmit signal is received by the switch 408 at Port 1. Since Port 1 is connected to Port 2 during the transmit mode, the single-ended RF transmit signal is transferred to the input terminal 412I of the amplifier 412. The amplifier 412, operating as a power amplifier, amplifies the single-ended RF transmit signal and generates an amplified transmit signal at the output terminal 412O. The amplified transmit signal is received by the switch 408 at Port 3. Since Port 3 is connected to Port 4 during the transmit mode, the amplified transmit signal is transferred via Port 4 to the band pass filter 420. The band pass filter 420 filters the amplified transmit signal and the filtered output is provided to the antenna 424.

During the receive mode, a receive signal from the antenna 424 is filtered by the band pass filter 420, and the filtered receive signal is received at Port 4 of the switch 408. Since Port 4 is connected to Port 2 in the receive mode, the filtered receive signal is transferred via Port 2 to the input terminal 412I of the amplifier 412. The amplifier 412, operating as a low noise amplifier, amplifies the filtered receive signal to increase receiver sensitivity and generates an amplified receive signal at the output terminal 412O. The amplified receive signal is received at Port 3 of the switch 408. Since, Port 3 is connected to Port 1 in the receive mode, the amplified receive signal is transferred to the single-ended terminal 404S of the transformer 404 via Port 1. The transformer 404 outputs a differential receive signal at the differential terminal 404D, which is provided to the transceiver 402.

The front end circuit 400 provides increased receive sensitivity because the amplifier 412 operates as a low noise amplifier during the receive mode. Also, the utilization of the amplifier 412 both as a power amplifier and as a low noise amplifier decreases component count, cost and reduces size requirement, which are desirable in mobile applications. Also, as discussed before the use of a single DPDT-type switch results in reduced power loss. Furthermore, control of the amplifier 412 is simplified by eliminating the need for registers and I/O ports at the transceiver 402 because the amplifier 412 is no longer turned on and off. The dc bias voltage to the amplifier 412 is simply adjusted to operate the amplifier 412 as a power amplifier or as a low noise amplifier.

Figure 5:
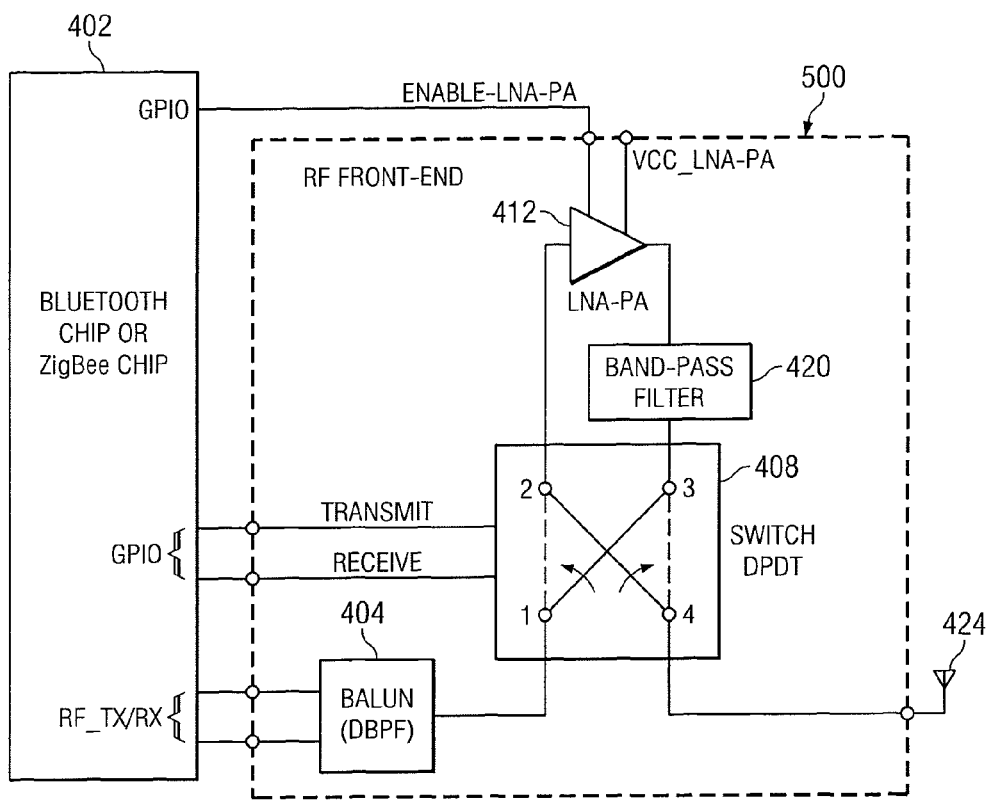
FIG. 5 is an enhanced sensitivity RF front end circuit, which is a modification of the front end circuit shown in FIG. 4.

FIG. 5 illustrates an enhanced sensitivity RF front end circuit 500, which is a modification of the front end circuit 400 shown in FIG. 4. The front end circuit 500 is similar to the circuit 400 except the band pass filter 420 shown in FIG. 5 is coupled to the output of the amplifier 312. The front end circuit 500 provides increased receive sensitivity because the band pass filter 420 is used to filter the amplified receive signal generated by the amplifier 412 during the receive mode. Also, the amplifier 412 operates both as a power amplifier and a low noise amplifier, thereby reducing total component count and size requirement and lowering the overall cost.

Figure 6:
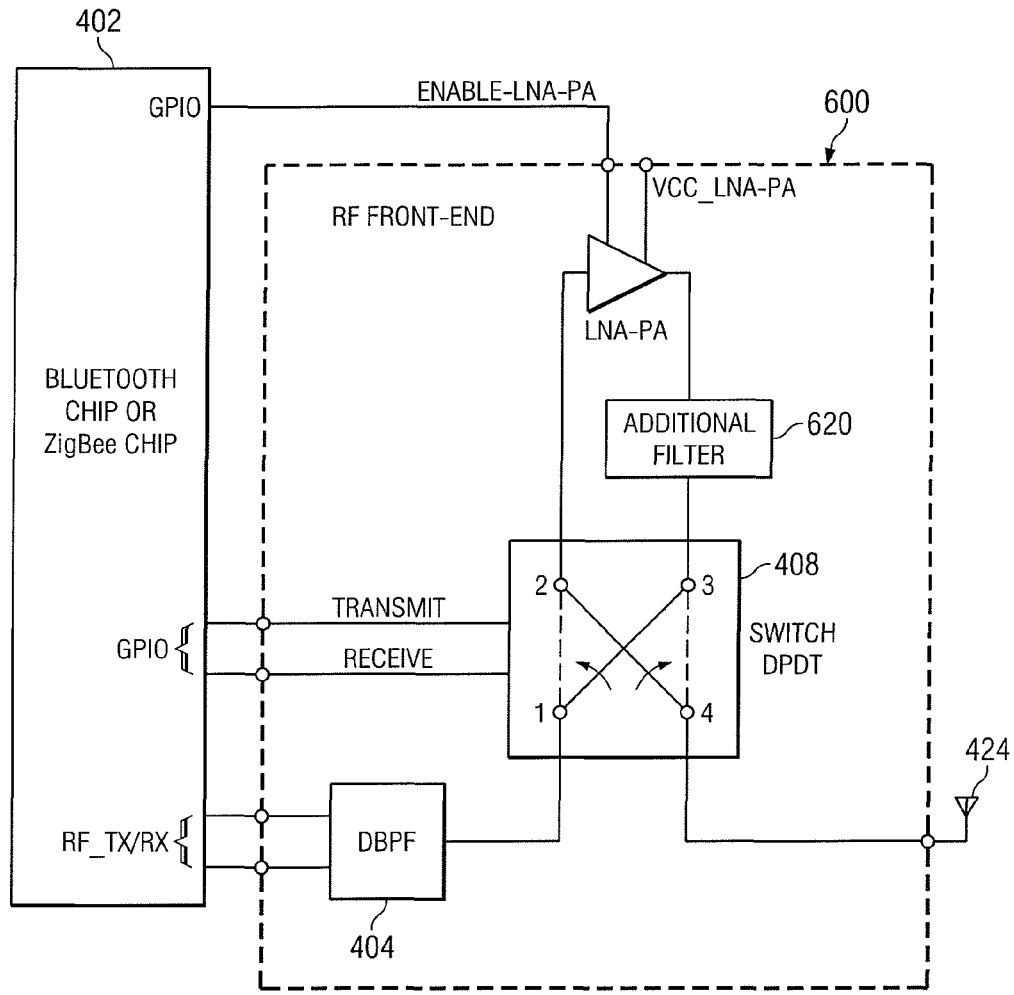
FIG. 6 is an enhanced sensitivity RF front end circuit, which is yet another modification of the front end circuit shown in FIG. 4.

FIG. 6 illustrates an enhanced sensitivity RF front end circuit 600, which is yet another modification of the front end circuit 400 shown in FIG. 4. The front end circuit 600 is similar to the circuit 400 except the band pass filter 420 shown in FIG. 4 is eliminated. The differential band-pass filter 404 is used between the transceiver chip 402 and the DPDT switch 408 to provide filtering in the transmit and receive modes. The front end circuit 600 provides increased efficiency during a transmit mode due to the elimination of the band pass filter 420 between the amplifier output and the antenna 424. The front end circuit 600 also provides increased receive sensitivity due to the elimination of the band pass filter loss between the antenna 424 and the amplifier 412. The front end circuit 600 may optionally include an additional low pass filter 620 coupled to the output of the amplifier 412 for rejection of higher order harmonics. The addition of the optional low pass filter 620 does not significantly degrade the efficiency as the low pass filter 620 exhibits lower loss than a typical band pass filter.

Figure 7:
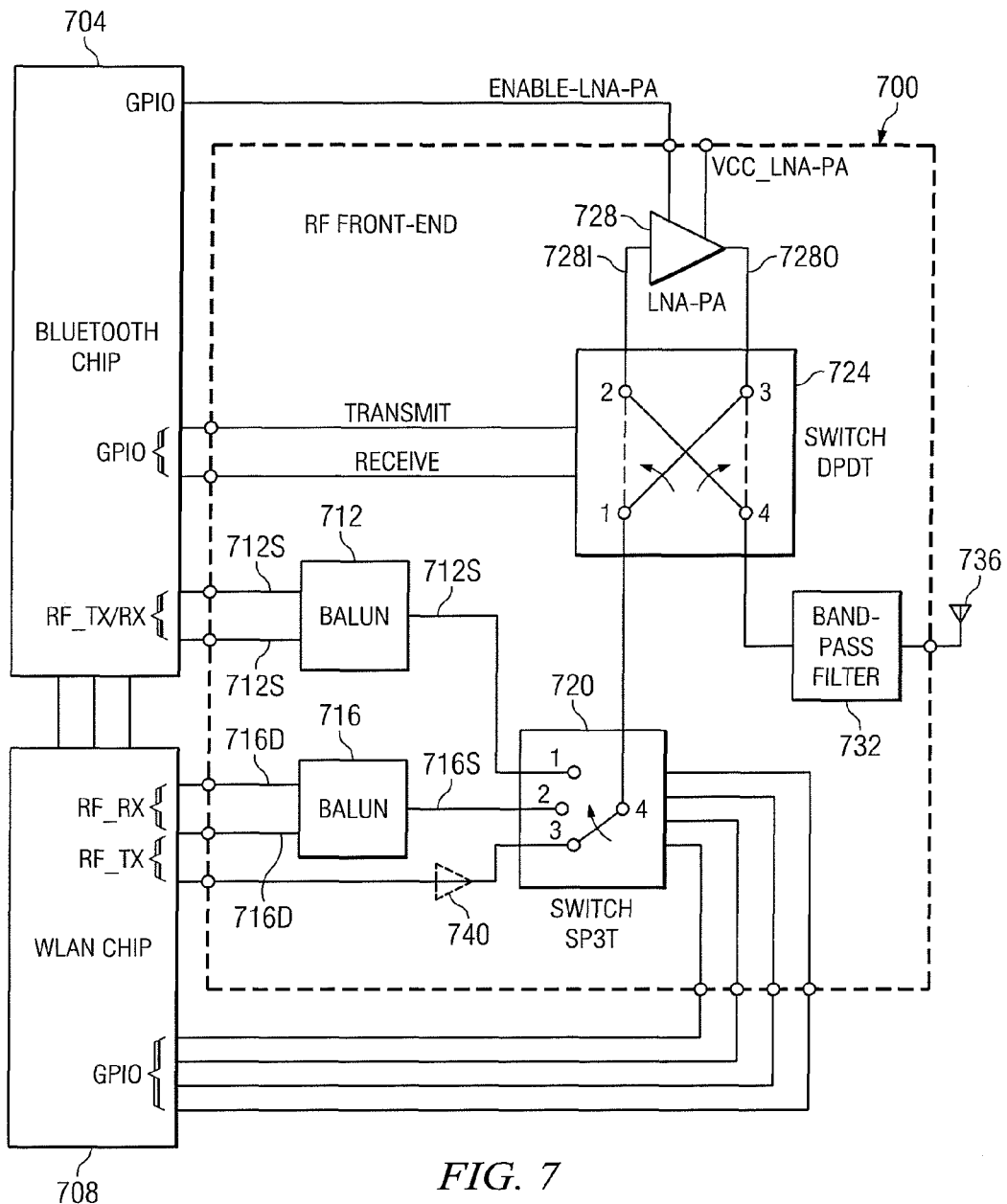
FIG. 7 is a dual mode RF front end circuit according to one example embodiment.

In one embodiment, a dual mode RF front end circuit interfaces with two separate transceivers, each operating in the same frequency band. FIG. 7 shows a dual mode RF front end circuit 700 that may interface with a Bluetooth transceiver 704 and a WLAN transceiver 708 operating in the same frequency band.

The front end circuit 700 includes a balun-type transformer 712 with a differential terminal 712D and a single-ended terminal 712S, the differential terminal 712D being coupled to a transmit/receive (RF_TX/RX) port of the Bluetooth transceiver 704. The front end circuit 700 includes another balun-type transformer 716 with a differential terminal 716D and a single-ended terminal 716S, the differential terminal 716D being coupled to a receive (RF_RX) port of the WLAN transceiver 708.

The front end circuit 700 includes a first switch 720 that selects either the Bluetooth transceiver 704 or the WLAN transceiver 708 for transmit/receive operation. In one embodiment, the first switch 720 is a single pole triple throw (SP3T) type switch having four ports, Ports 1-4. The ports of the switch 720 are connected as follows: Ports 1 and 2 are connected to the single-ended terminals of the transformers 712S and 716S, respectively, and Port 3 is connected to a transmit port of the WLAN transceiver 708. When the Bluetooth transceiver 704 is operational, i.e., the Bluetooth transceiver 704 is transmitting or receiving, Port 4 is connected to Port 1, thereby enabling the Bluetooth transceiver 704 to transmit or to receive. When the WLAN transceiver 708 is in a transmit mode, Port 4 is connected to Port 3, thereby enabling the WLAN transceiver 708 to transmit, and when the WLAN transceiver 708 is in a receive mode. Port 4 is connected to Port 2, thereby enabling the WLAN transceiver 708 to receive a signal. The internal connections among Ports 1-4 of the switch 720 may be controlled by control signals provided by the Bluetooth transceiver 704 or the WLAN transceiver 708.

The front end circuit 700 includes a second switch 724 that alternatively electrically connects the switch 720 and a filter 732 to one of the input and output ports, 728I and 728O, respectively, of an amplifier 728. More specifically, the switch 724 may be a DPDT-type switch with four ports, Ports 1-4. The ports of the switch 724 are connected as follows: Port 1 of the switch 724 is connected to Port 1 of the switch 720; Port 2 is connected to an input terminal 728I of the amplifier 728; Port 3 is connected to an output terminal 728O of the amplifier 728; Port 4 is connected to the band pass filter 732.

When the Bluetooth transceiver 704 or the WLAN transceiver 708 is in a transmit mode, responsive to a first control signal (Transmit) the internal connection of the switch 724 are configured so that Port 1 is connected to Port 2 and Port 3 is connected to Port 4 (see, dotted lines). Consequently, when the Bluetooth transceiver 704 or the WLAN transceiver 708 is transmitting, RF signal passes through Port 4 of the switch 720, Ports 1 and 2 of the switch 724, the amplifier 724. Ports 3 and 4 of the switch 724 and the filter 732. The amplifier 728 operates as a power amplifier during the transmit mode to amplify the signal. The filter 732 may be a band pass filter that attenuates selected frequencies. The output of the band pass filter 732 is provided to an antenna 736 for wireless transmission.

When the Bluetooth transceiver 704 or the WLAN transceiver 708 is in a receive mode, responsive to a second control signal (Receive), the internal connections of the switch 724 are configured so that Port 1 is connected to Port 3 and Port 2 is connected to Port 4 (see, solid lines).

Consequently, when the Bluetooth transceiver 704 or the WLAN transceiver 708 is in a receive mode, RF signal received by the antenna 736 passes through the band pass filter 732, Ports 4 and 2 of the switch 724, the amplifier 728, Ports 3 and 1 of the switch 724 and through Port 4 of the switch 720. The amplifier 728 operates as a low noise amplifier during the receive mode. When the Bluetooth transceiver 704 is in a receive mode, the internal connections of the first switch 720 is controlled so that Port 4 is connected to Port 1, thereby routing the RF signal to the Bluetooth transceiver 704. When the WLAN transceiver 708 is in a receive mode, the internal connections of the first switch 720 is controlled so that Port 4 is connected to Port 2, thereby routing the RF signal to the WLAN transceiver 708.

There are several advantages of the front end circuit 700. Since the front end circuit 700 interfaces with both Bluetooth and WLAN chips, the total number of components required for dual mode operations is reduced. The reduction in the total number of components results in a decrease in overall cost and size of the dual band front end module, which is highly desired in mobile applications. Also, a common amplifier operating both as a power amplifier and a low noise amplifier results in decreased component count, cost and size. Also, the low noise amplifier increases receive sensitivity of the circuit 700. Also, since the transition between the power amplifier and the low noise amplifier is controlled by adjusting a bias voltage, fewer registers and I/O pins are required to control the front end circuit 700. In one embodiment, an optional WLAN driver amplifier 740 indicated by the dotted lines may be coupled to the transmit port RF_TX of the WLAN transceiver 708. The WLAN driver amplifier 740 provides additional power in order to compensate for the generally low output power of the WLAN transceiver 708 as compared to the Bluetooth transceiver 704. The WLAN driver amplifier 740 may optionally be integrated with the amplifier 728 as a single stage amplifier.

Figure 8:
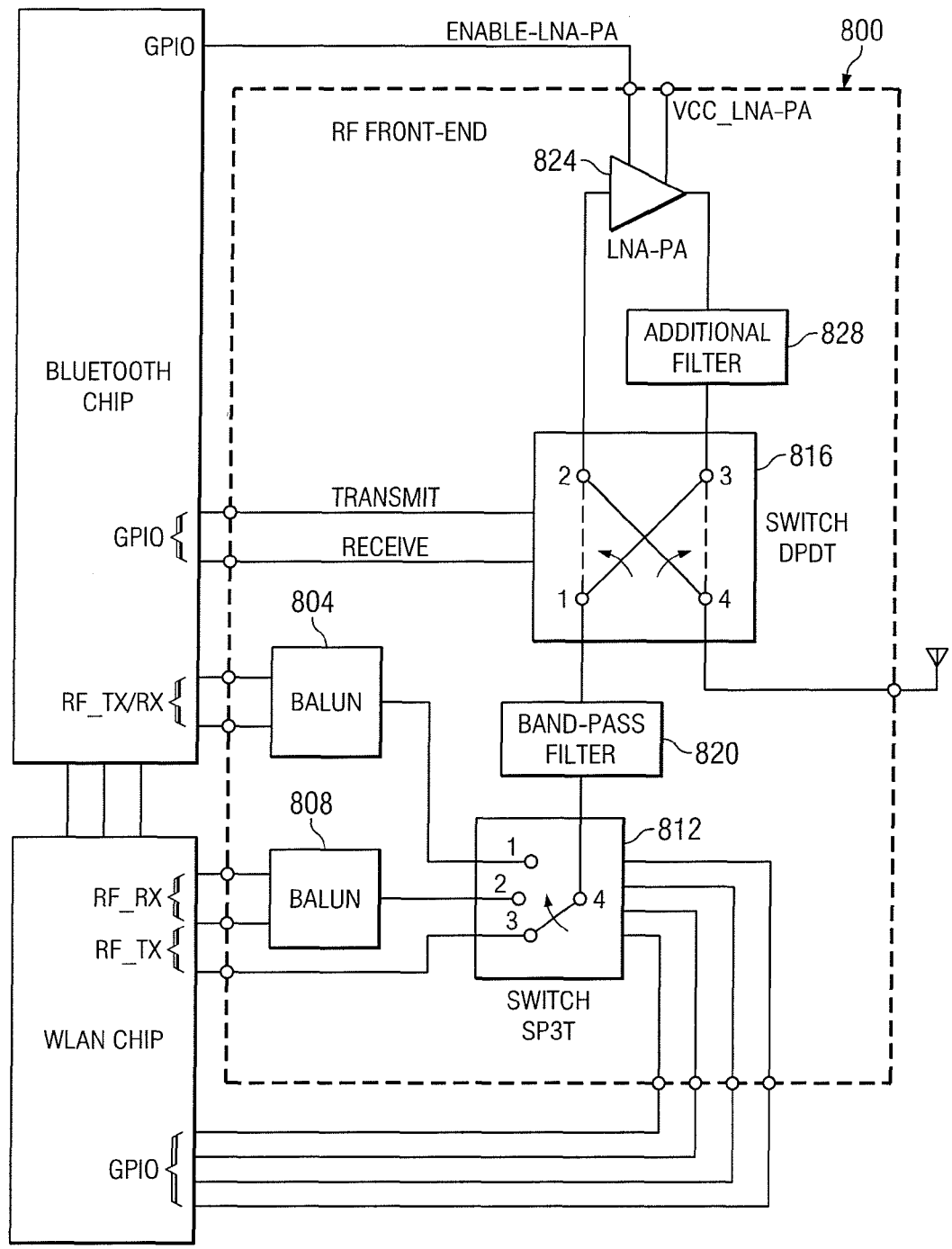
FIG. 8 is a dual mode front end circuit, which is a modification of the front end circuit shown in FIG. 7.

FIG. 8 shows a dual mode front end circuit 800, which is a modification of the front end circuit 700 shown in FIG. 7. The front end circuit 800 includes transformers 804 and 808, a first switch 812 and a second switch 816, a band pass filter 820, and an amplifier 824. The front end circuit 800 is similar in construction as the front end circuit 700 shown in FIG. 7, except the band pass filter 820 is connected in series between the first and second switches 812 and 824. The front end circuit 800 exhibits increased receive sensitivity due to the elimination of the band pass filter loss between an antenna 832 and the amplifier 824 operating as a low noise amplifier during the receive mode. Also, transmit efficiency is increased due to the band pass filter loss elimination at the power amplifier output during the transmit mode. The utilization of the amplifier both as a low noise amplifier and a power amplifier reduces component count, lowers cost and saves space inside a module. The use of a single DPDT-type switch in the front end circuit 800 instead of two SPDT-type switches used in traditional circuit decreases power loss in the receive mode, thereby increasing sensitivity. An additional low pass filter 828 may be optionally utilized at the output of the amplifier 824 to attenuate selected frequencies. The optional low pass filter 828 does not considerably degrade efficiency due to low power loss at the low pass filter 828.

The foregoing description of illustrated embodiments is not intended to be exhaustive or to limit the disclosure to the precise forms disclosed herein. While specific embodiments and examples are described herein for illustrative purposes only, various equivalent modifications are possible within the spirit and scope of the disclosure, as those skilled in the relevant art will recognize and appreciate. As indicated, these modifications may be made in light of the foregoing description of illustrated embodiments and are to be included within the spirit and scope of the disclosure.

Thus, while the disclosure has been described herein with reference to particular embodiments thereof, a latitude of modification, various changes and substitutions are intended in the foregoing disclosures, and it will be appreciated that in some instances some features of embodiments will be employed without a corresponding use of other features without departing from the scope and spirit of the disclosure as set forth. Therefore, many modifications may be made to adapt a particular situation or material to the essential scope and spirit of the disclosure, it is intended that the disclosure not be limited to the particular terms used in following claims and/or to the particular embodiment disclosed, but that the disclosure will include any and all embodiments and equivalents falling within the scope of the appended claims. Thus, the scope of the invention is to be determined solely by the appended claims.

What is claimed is:

1. An enhanced sensitivity radio frequency (RF) front end circuit, comprising:
    a transformer configured to convert a balanced transmit signal to an unbalanced transmit signal and convert a second filtered receive signal to a balanced receive signal;
    a switch configured to operate in first and second states, the switch in the first state operable to receive the unbalanced transmit signal from the transformer and transfer the unbalanced transmit signal to an amplifier circuit and receive an amplified transmit signal from the amplifier circuit and transfer the amplified transmit signal to a filter, the switch in the second state operable to receive a first filtered receive signal from the filter and transfer the first filtered receive signal to the amplifier circuit and receive the second filtered receive signal from the amplifier circuit and transfer the second filtered receive signal to the transformer;
    the amplifier circuit having circuitry configurable to operate in first and second modes, the circuitry of the amplifier circuit operating in the first mode as a power amplifier in response to receipt of a bias voltage having a first DC voltage to receive the unbalanced transmit signal from the switch and generate the amplified transmit signal, the circuitry of the amplifier circuit operating in the second mode as a low noise amplifier in response to receipt of the bias voltage having a second DC voltage different from the first DC voltage to receive the first filtered receive signal from the switch and generate the second filtered receive signal;
    the filter configured to receive the amplified transmit signal from the switch and attenuate frequencies outside a pass band to generate a filtered transmit signal and receive a receive signal and attenuate frequencies outside the pass band to generate the first filtered receive signal;
    wherein the circuitry of the amplifier circuit has an input node coupled to the switch, an output node coupled to the switch and a single bias voltage node that is configured to receive said bias voltage having the first and second DC voltages, said amplifier circuit operating to amplify a signal received at the input node for output at the output node, said circuitry of the amplifier circuit operating in response to receipt at said single bias voltage node of the first DC voltage as the power amplifier coupled between the input node and output node, and further operating in response to receipt at said single bias voltage node of the second DC voltage as the low noise amplifier coupled between the input node and output node.

2. The RF front end circuit of claim 1, wherein the switch is a double pole double throw (DPDT) switch configured to be in the first state responsive to a first control voltage and to be in the second state responsive to a second control voltage.

3. The RF front end circuit of claim 1, wherein the filter is a band pass filter.

4. The RF front end circuit of claim 1, wherein the transformer is configured to receive the balanced transmit signal from a transceiver and provide the balanced receive signal to the transceiver.

5. The RF front end circuit of claim 1, wherein the transformer is configured to receive the balanced transmit signal from a Bluetooth transceiver and provide the balanced receive signal to the Bluetooth transceiver.

6. The RF front end circuit of claim 1, wherein the transformer is configured to receive the balanced transmit signal from a ZigBee transceiver and provide the balanced receive signal to the ZigBee transceiver.

7. An enhanced sensitivity radio frequency (RF) front end circuit, comprising:
    a differential band pass filter configured to attenuate frequencies outside a selected pass band, the differential band pass filter configured to receive a differential transmit signal and generate a filtered single-ended transmit signal and receive a single-ended receive signal and generate a differential filtered receive signal;
    a switch configured to operate in first and second states, the switch in the first state operable to receive the filtered single-ended transmit signal from the differential band pass filter and transfer the filtered single-ended transmit signal to an amplifier circuit and receive an amplified transmit signal from the amplifier circuit and output the amplified transmit signal, the switch in the second state operable to receive a first receive signal and transfer the first receive signal to the amplifier circuit and receive the single-ended receive signal from the amplifier circuit and transfer the single-ended receive signal to the differential band pass filter;
    the amplifier circuit having circuitry configurable to operate in first and second modes, the circuitry of the amplifier circuit operating in the first mode as a power amplifier in response to receipt of a bias voltage having a first DC voltage to receive the filtered single-ended transmit signal from the switch and generate an amplified transmit signal, the circuitry of the amplifier circuit operating in the second mode as a low noise amplifier in response to receipt of the bias voltage having a second DC voltage different from the first DC voltage to receive the first receive signal from the switch and generate the single-ended receive signal;
    wherein the circuitry of the amplifier circuit has an input node coupled to the switch, an output node coupled to the switch and a single bias voltage node that is configured to receive said bias voltage having the first and second DC voltages, said amplifier circuit operating to amplify a signal received at the input node for output at the output node, said circuitry of the amplifier circuit operating in response to receipt at the bias voltage node of the first DC voltage as the power amplifier coupled between the input node and output node, and further operating in response to receipt at the bias voltage node of the second DC voltage as the low noise amplifier coupled between the input node and output node.

8. The RF front end circuit of claim 7 further comprising a low pass filter coupled to the output of the amplifier circuit, the low pass filter configured to attenuate frequencies from the amplifier output.

9. The RF front end circuit of claim 7, wherein the switch is a double pole double throw (DPDT) switch configured to be in the first state responsive to a first control voltage and to be in the second state responsive to a second control voltage.

10. The RF front end circuit of claim 7, wherein the differential band pass filter is configured to receive the differential transmit signal from a transceiver and provide the differential filtered receive signal to the transceiver.

11. The RF front end circuit of claim 7, wherein the differential band pass filter is configured to receive the differential transmit signal from a Bluetooth transceiver and provide the differential filtered receive signal to the Bluetooth transceiver.

12. The RF front end circuit of claim 7, wherein the differential band pass filter is configured to receive the differential transmit signal from a ZigBee transceiver and provide the differential filtered receive signal to the ZigBee transceiver.

13. A radio frequency (RF) front end circuit, comprising:
a switch having a first node, second node, third node and fourth node, said switch configurable to operate in a first state where the first node is connected to the second node and the third node is connected to the fourth node and further operable in a second state where the first node is connected to the third node and the second node is connected to the fourth node; and
an amplifier circuit having an input node coupled to the second node of the switch and an output node coupled to the third node of the switch, said amplifier circuit further having a bias voltage node that is configured to receive a single bias voltage having a first DC value and a second DC value, said amplifier circuit operable as a power amplifier coupled between the second node of the switch and the third node of the switch when the switch is in the first state and in response to receipt at the bias voltage node of the bias voltage with the first DC value, said amplifier circuit further operable as a low noise amplifier coupled between the second node of the switch and the third node of the switch when the switch is in the second state and in response to receipt at the bias voltage node of the bias voltage with the second DC value.

14. The RF front end circuit of claim 13, wherein the switch is a double pole double throw (DPDT) switch configured to be in the first state responsive to a first control voltage and to be in the second state responsive to a second control voltage.

15. The RF front end circuit of claim 13 further comprising a low pass filter coupled to the output node of the amplifier circuit, the low pass filter configured to attenuate frequencies from the amplifier output.

* * * * *

UNITED STATES PATENT AND TRADEMARK OFFICE
CERTIFICATE OF CORRECTION

PATENT NO. : 8,301,186 B2  
APPLICATION NO. : 12/062666  
DATED : October 30, 2012  
INVENTOR(S) : Oleksandr Gorbachov Page 1 of 1

It is certified that error appears in the above-identified patent and that said Letters Patent is hereby corrected as shown below:

In the Specification:

At column 5, line number 11, replace [2120] with -- 212O --.

At column 6, line number 45, replace [convened] with -- converted --.

At column 7, line 31, replace [404S of the transformer 404,] with -- 404S of the transformer 404; --.

At column 7, line number 32, replace [4121] with -- 412I --.

At column 7, line number 33, replace [4120] with -- 412O --.

At column 8, line number 9, replace [4121] with -- 412I --.

At column 8, line number 12, replace [4120] with -- 412O --.

At column 11, line number 5, replace [disclosure, it is] with -- disclosure. It is --.

Signed and Sealed this  
Twelfth Day of February, 2013

Teresa Stanek Rea  
*Acting Director of the United States Patent and Trademark Office*